US010915086B2

(12) United States Patent
Ota et al.

(10) Patent No.: US 10,915,086 B2
(45) Date of Patent: Feb. 9, 2021

(54) NUMERICAL CONTROLLER CAPABLE OF PROPERLY PERFORMING PROGRAM RESTART EVEN IF MACHINING CONDITIONS OF A MACHINING CYCLE ARE CHANGED

(71) Applicant: FANUC CORPORATION, Yamanashi (JP)

(72) Inventors: Yasuhiro Ota, Yamanashi (JP); Shinichirou Itakura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 10 days.

(21) Appl. No.: 16/150,899

(22) Filed: Oct. 3, 2018

(65) Prior Publication Data
US 2019/0107822 A1 Apr. 11, 2019

(30) Foreign Application Priority Data

Oct. 5, 2017 (JP) ................................. 2017-194979

(51) Int. Cl.
*G05B 19/402* (2006.01)
*G05B 19/4155* (2006.01)

(52) U.S. Cl.
CPC ....... *G05B 19/402* (2013.01); *G05B 19/4155* (2013.01); *G05B 2219/34093* (2013.01); *G05B 2219/36089* (2013.01); *G05B 2219/36099* (2013.01)

(58) Field of Classification Search
CPC .............. G05B 19/402; G05B 19/4155; G05B 19/4067; G05B 2219/36099; G05B 2219/30689; G05B 2219/34093; G05B 2219/34365
See application file for complete search history.

(56) References Cited

U.S. PATENT DOCUMENTS

| 4,815,000 A | * | 3/1989 | Yoneda | G05B 19/408 |
| | | | | 318/571 |
| 5,298,843 A | * | 3/1994 | Miyajima | G05B 19/4067 |
| | | | | 318/567 |
| 5,414,633 A | * | 5/1995 | Chang | G05B 19/4067 |
| | | | | 700/190 |
| 6,036,347 A | * | 3/2000 | Tomita | G05B 19/40937 |
| | | | | 700/160 |
| 9,904,279 B2 | * | 2/2018 | Haga | G05B 19/042 |

(Continued)

FOREIGN PATENT DOCUMENTS

JP          63265305 A      11/1988
JP       2004261947 A       9/2004
(Continued)

OTHER PUBLICATIONS

Japanese Notice of Reasons for Refusal for Japanese Application No. 2017-194979, dated Nov. 26, 2019, with translation, 6 pages.

*Primary Examiner* — M. N. Von Buhr
(74) *Attorney, Agent, or Firm* — RatnerPrestia

(57) ABSTRACT

A numerical controller which performs program restart after machining is stopped in the middle of a machining cycle is provided with a program restart unit. The numerical controller can use the program restart unit to acquire a restart position located in a machining area defined by the machining cycle, create a new machining area by dividing the defined machining area in the restart position, and restart the machining for the new machining area.

4 Claims, 13 Drawing Sheets

(56) References Cited

U.S. PATENT DOCUMENTS

| | | | | |
|---|---|---|---|---|
| 2004/0153199 | A1* | 8/2004 | Sagasaki | G05B 19/4067 700/169 |
| 2006/0149411 | A1* | 7/2006 | Kochiya | G05B 19/4067 700/160 |
| 2006/0251484 | A1* | 11/2006 | Yoshida | B23Q 15/16 409/131 |
| 2006/0282559 | A1* | 12/2006 | Tokura | G05B 19/4155 710/32 |
| 2008/0103625 | A1* | 5/2008 | Mochida | G05B 19/4067 700/174 |
| 2009/0055016 | A1* | 2/2009 | Fujibayashi | G05B 19/4067 700/159 |
| 2010/0057251 | A1* | 3/2010 | Ikushima | G05B 19/4067 700/245 |
| 2011/0190915 | A1* | 8/2011 | Fujishima | G05B 19/4067 700/97 |
| 2014/0012408 | A1* | 1/2014 | Haga | G05B 19/18 700/159 |
| 2015/0112475 | A1* | 4/2015 | Murakawa | G05B 19/19 700/189 |
| 2015/0227133 | A1 | 8/2015 | Kurohara | |
| 2016/0085232 | A1* | 3/2016 | Haraguchi | G05B 19/402 700/184 |
| 2016/0147212 | A1* | 5/2016 | Kurosumi | G05B 19/4065 700/160 |
| 2016/0224007 | A1* | 8/2016 | Zeniya | G05B 19/4067 |
| 2017/0285606 | A1* | 10/2017 | Matsumura | G05B 19/31 |
| 2018/0348730 | A1* | 12/2018 | Reekmans | B25J 9/1664 |

FOREIGN PATENT DOCUMENTS

| | | |
|---|---|---|
| JP | 2007188170 A | 7/2007 |
| JP | 2008-158726 A | 7/2008 |
| JP | 2014-026430 | 2/2014 |
| JP | 2015-153063 A | 8/2015 |

* cited by examiner

```
MACHINING
PROGRAM
                1000
                N0001 G28 U0 W0
                N0002 T101
                N0003 G99 G96 S150
                N0004 M03
                N0005 G00 XJ20.Z20.
                G1120 P1. Q5. H100. C0.5 D0.5 F0.8 K100. W2. V1. L2. M1. Z10. X1. Y1.;
                G1450 H0.V19.A0.
                G1451 H-1.V20.K4.D20.A45.L0.M0.T1.
                G1451 H-22.494447V20.K5.L0.M0.T1.
                G1455 H-25.092523V21.5R3.I-22.494447J23.K2.T1.
MACHINING       G1451 H-30.V30.K4.C-30.D30.A60.L0.M0.T1.
CYCLE           G1451 H-45.719431V30.K5.L0.M0.T1.
                G1455 H-48.673855V32.479055R3.I-45.719431J33.K2.T1.
                G1451 H-50.V40.K4.C-50.D40.A80.L0.M0.T1.
                G1451 H0.V40.K1.C0.L0.M0.T2.
                G1451 H0.V19.K7.D19.L0.M0.T2.
                G1456 N0042 G00 X200.
                N1000 M05
                N1001 G28 U0. W0.
                N1002 M02
```

MATERIAL SHAPE

PART SHAPE

```
1000
N0001 G28 U0 W0
N0002 T101
N0003 G99 G96 S150
N0004 M03
N0005 G00 X120 Z20
G1120 P1. Q5. H100. C0.5 D0.5 F0.8 K100. W2. V1. L2. M1.
Z10. X1. Y1;
G1450 H0.V19.A0.
G1451 H-1.V20.K4.D20.A45.L0.M0.T1.
G1451 H-22.494447V20.K5.L0.M0.T1.
G1455 H-25.092523V21.5R3.I-22.494447J23.K2.T1.
G1451 H-30.V30.K4.C-30.D30.A60.L0.M0.T1.
G1451 H-45.719431V30.K5.L0.M0.T1.
G1455 H-48.673855V32.479055R3.I-45.719431J33.K2.T1.
G1451 H-50.V40.K4.C-50.D40.A80.L0.M0.T1.
G1451 H0.V40.K1.C0.L0.M0.T2.
G1451 H0.V19.K7.D19.L0.M0.T2.
G1456 N0042 G00 X200.
N1000 M05
N1001 G28 U0. W0.
N1002 M02
```

MACHINING CYCLE

```
G40
G18
G0Z1.
X70.
G1Z-48.739F0.8
X78.851Z-49.52F1.
X80.851Z-48.52F0.8
G0Z1.
X60.
G1Z-29.761
X61.Z-30.049F1.
Z-46.519F0.8
G2X63.81Z-48.194I1.7K0.F1.
G1X70.Z-48.739
X72.Z-47.739F0.8
G0Z1.
X50.
G1Z-26.874
X60.Z-29.761F1.
X62.Z-28.761F0.8
G0Z1.
X40.
G1Z-0.762
X41.Z-1.262F1.
Z-23.294F0.8
G2X42.7Z-24.767I1.7K0.F1.
G1X50.Z-26.874
X52.Z-25.874F0.8
G0Z1.
X40.
G1X36.477F0.6
X40.Z-0.762F1.
X42.Z0.238F0.8
G0X84.
G18F0.8
```

FIG.6
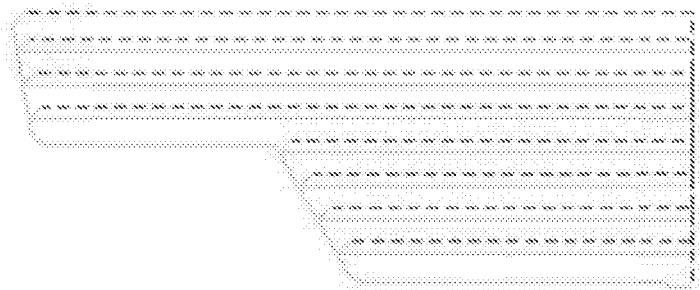
FIG.7
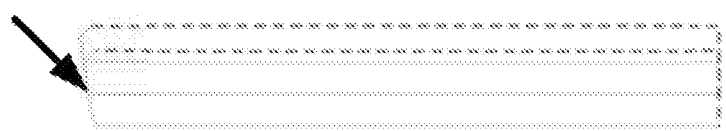

FIG.8
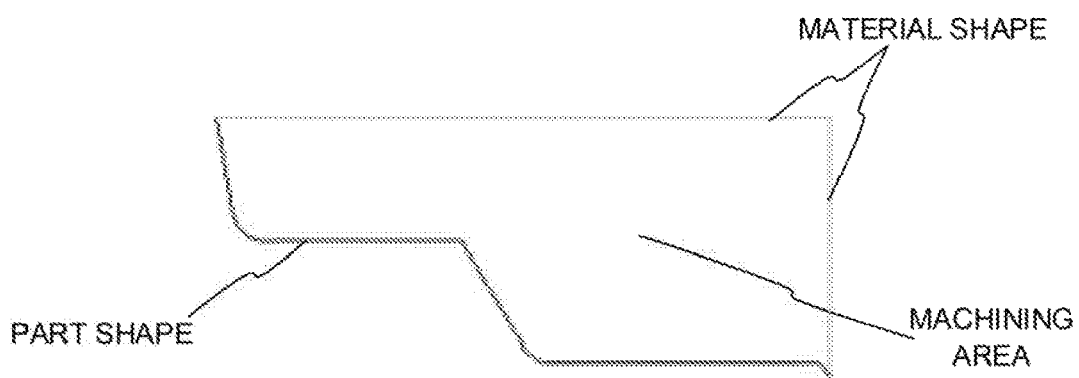
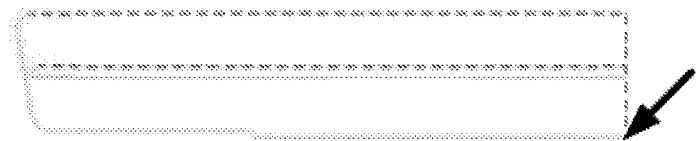
FIG.9
| PROGRAM RESTART | |
|---|---|
| BLOCK SEARCH>RECONSTRUCTION OF AUXILIARY FUNCTION>TRANSFER OF POSITION RESTART | |
| COMMAND RESTART | COORDINATE VALUES |
| COORDINATE RESTART  X | 30. |
| Z | 1 |
| C | 0. |
| Y | 0. |
| A | 0. |

FIG.14
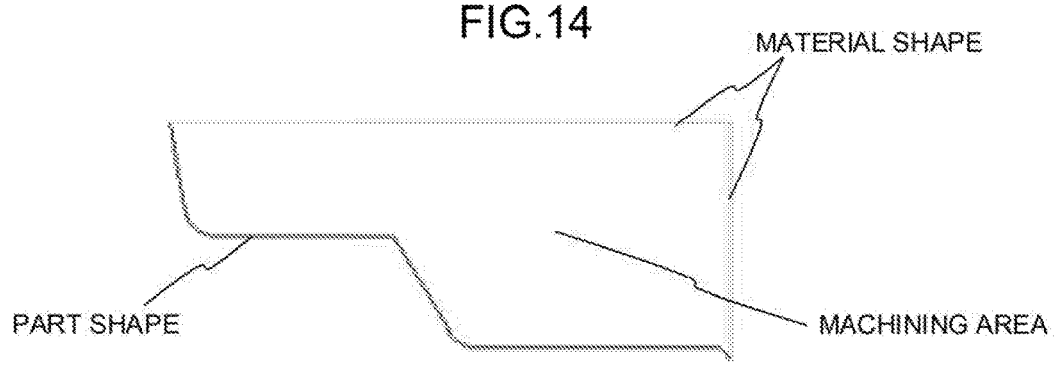
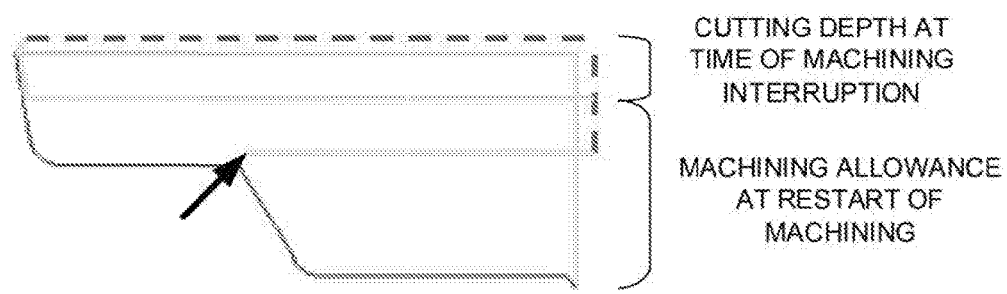
FIG.15
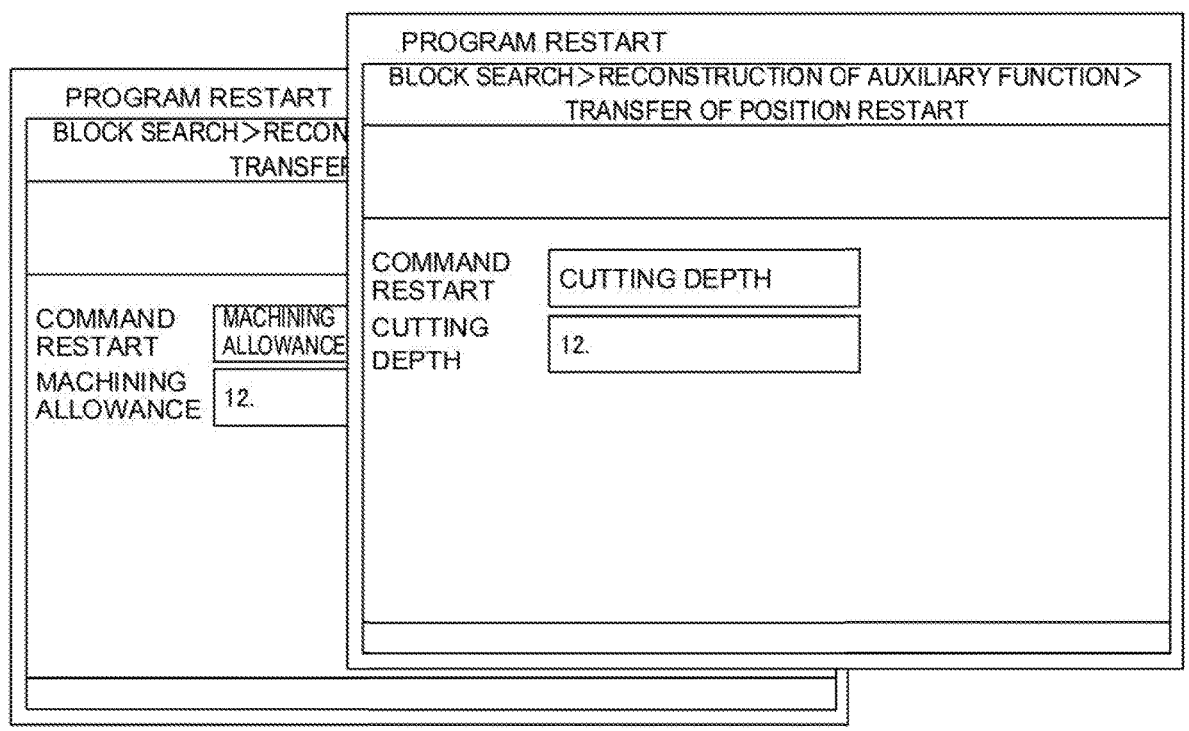

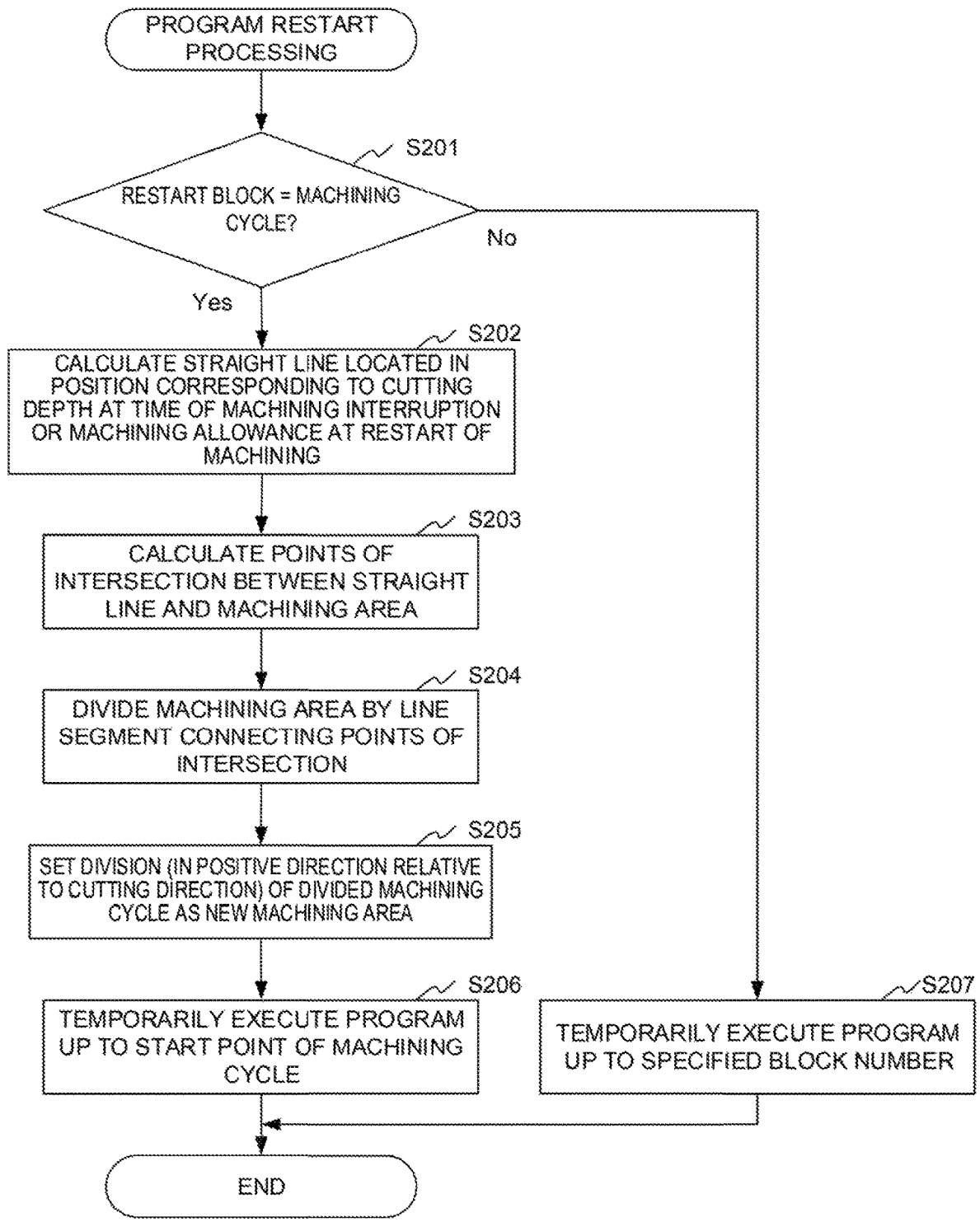

NUMERICAL CONTROLLER CAPABLE OF PROPERLY PERFORMING PROGRAM RESTART EVEN IF MACHINING CONDITIONS OF A MACHINING CYCLE ARE CHANGED

CROSS-REFERENCE TO RELATED APPLICATION

This application is a new U.S. Patent Application that claims benefit of Japanese Patent Application No, 2017-194979, filed Oct. 5, 2017, the disclosure of this application is being incorporated herein by reference in its entirety for all purposes.

BACKGROUND OF THE INVENTION

Field of the Invention

The present invention relates to a numerical controller, and more particularly, to a numerical controller having the function of restarting a program in the middle of a machining cycle.

Description of the Related Art

Program restart is a function of restarting machining based on a machining program (hereinafter referred to as the program) from a stop position after the machining is stopped in the middle. According to the program restart function, the machining can be restarted without causing idling by specifying the sequence number or block number (number of blocks from the head of the program to a block expected to be restarted) of the block expected to be restarted in the program having been executed before the machining is stopped. The program restart function is useful, for example, if a tool is broken during the machining or the machining interrupted before a holiday break is expected to be restarted just after the break.

Japanese Patent Applications Laid-Open Nos. 2015-153063, 2008-158726, and 2014-026430 disclose prior art techniques related to the program restart. Japanese Patent Application Laid-Open No. 2015-153063 describes a numerical controller capable of checking before program restart whether or not machining conditions are changed without errors after machining is stopped in the middle. Japanese Patent Application Laid-Open No. 2008-158726 describes a machining control device configured to restart machining with an optimal approach after the machining is stopped in the middle. Japanese Patent Application Laid-Open No. 2014-026430 describes a numerical controller configured to display the difference between states (modal information, etc.) of a machine during interruption and at restart of machining at the time of program restart when setting, such as machining program editing, is changed after the machining is stopped in the middle.

In the device described in Japanese Patent Application Laid-Open No. 2015-153063, however, the program cannot be restarted properly if the number of blocks of a machining path is changed as a result of the change of the machining conditions. In the device described in Japanese Patent Application Laid-Open No. 2008-158726, the program cannot be restarted properly if a tool path of a machining cycle is changed as a result of the change of the machining conditions. The device described in Japanese Patent Application Laid-Open No. 2014-026430 only checks whether or not the states (modal information, etc.) of the machine before and after the interruption of the machining are consistent, so that a necessary adjustment for the program restart must be made manually.

SUMMARY OF THE INVENTION

The present invention has been made to solve the above problems and has an object to provide a numerical controller capable of properly performing program restart even if machining conditions of a machining cycle are changed after machining is stopped in the middle of the machining cycle.

A numerical controller according to one embodiment of the present invention is a numerical controller which performs program restart after machining is stopped in the middle of a machining cycle and comprises a program restart unit configured to acquire a restart position located in a machining area defined by the machining cycle, create a new machining area by dividing the defined machining area in the restart position, and restart the machining for the new machining area.

In the numerical controller according to the one embodiment of the present invention, the restart position is given by coordinate values.

In the numerical controller according to the one embodiment of the present invention, the restart position is given by a cutting depth at the point in time of interruption of the machining or a machining allowance at the restart of the machining.

In the numerical controller according to the one embodiment of the present invention, the program restart unit stores a tool position at which the machining is stopped as the restart position.

According to the present invention, there can be provided a numerical controller capable of properly performing program restart even if machining conditions of a machining cycle are changed after machining is stopped in the middle of the machining cycle.

BRIEF DESCRIPTION OF THE DRAWINGS

The above and other objects and features of the present invention will be obvious from the ensuing description of embodiments with reference to the accompanying drawings, in which:

FIG. 6 is a diagram showing a tool path based on commands of FIG. 5;

FIG. 7 is a diagram illustrating influences of the change of cutting conditions of the machining cycle;

FIG. 8 is a diagram showing the operation of a numerical controller according to Example 1;

FIG. 9 is a diagram showing the operation of the numerical controller according to Example 1;

FIG. 14 is a diagram showing the operation of a numerical controller according to Example 2;

FIG. 15 is a diagram showing the operation of the numerical controller according to Example 2;

FIG. 19 is a flowchart showing the operation of the numerical controller according to Example 2.

DETAILED DESCRIPTION OF THE PREFERRED EMBODIMENTS

First, in order to clarify the objective of the present invention, problems that can arise if a program is restarted with machining conditions of a machining cycle changed after machining is stopped in the middle of the machining cycle will be described in the following.

The program may sometimes include a machining cycle. The machining cycle is a group of commands that define cutting conditions and machining areas. A numerical controller generates a group of commands that define a tool path based on the cutting conditions and the machining areas defined by the machining cycle. The numerical controller replaces the command group of the machining cycle with the command group for the tool path and controls operation axes according to the tool path.

Figures 1A, 1B:
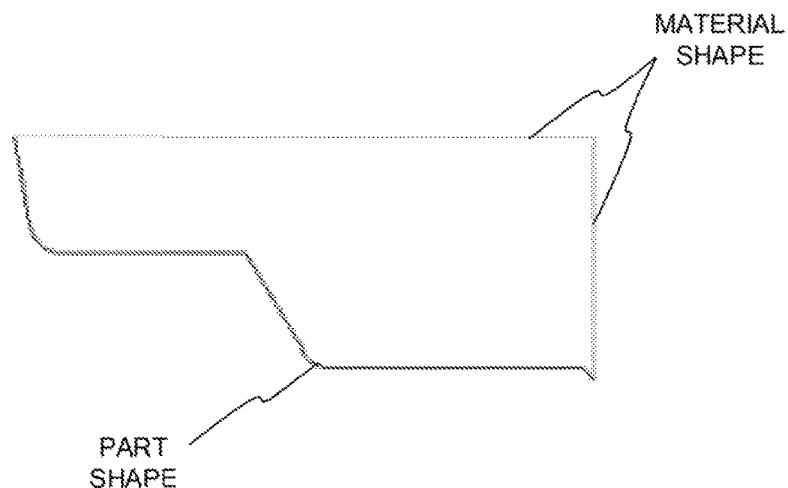
FIG. 1A is a diagram showing an example of a program including a machining cycle.
FIG. 1B is a diagram showing an example of a machining area.

FIG. 1A shows an example of the program including the machining cycle. In this program for outer-diameter rough-turning processing, blocks G1120 to G1456 constitute the machining cycle.

G1120 commands cutting conditions (including P: cutting direction, Q: cutting depth, H: cutting depth change rate, C: X-axis direction finishing allowance, D: Z-axis direction finishing allowance, F: cutting direction feed rate, K: first feed override, W: round-up method specification, V: round-up direction feed rate, L: X-axis direction clearance, M: Z-axis direction clearance, Z: approach method specification, X: pocket portion machining method specification, Y: overhanging portion machining method specification, etc.) (cutting condition commands). G1450 to G1456 command machining shapes (shape commands). FIG. 1B shows a machining area defined by the shape commands. The machining area is an area surrounded by a part shape formed by lathe turning and a material shape indicative of the external shape of a material before machining.

Figure 2:
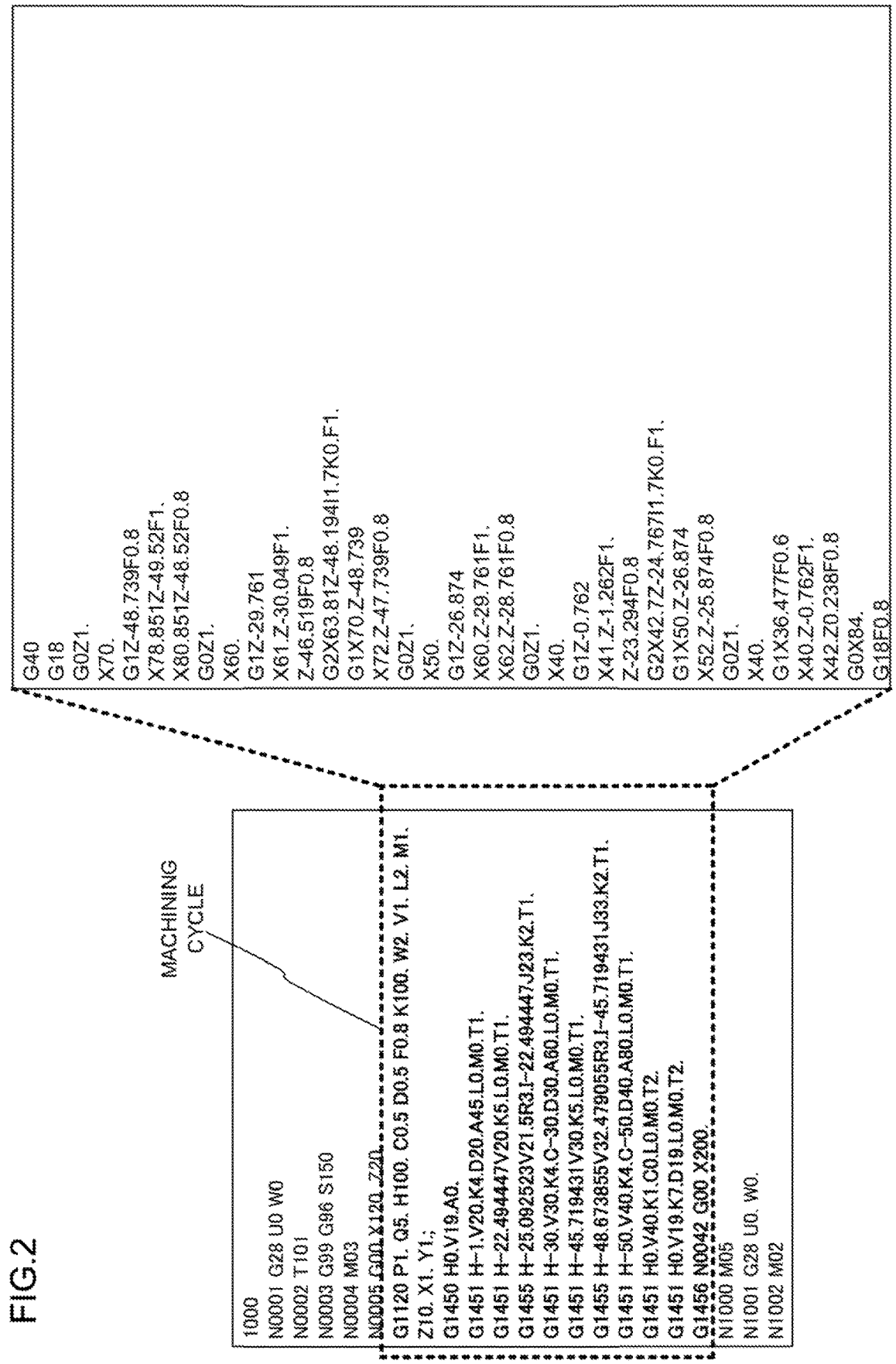
FIG. 2 is a diagram showing a block group that is commanded when the machining cycle of FIG. 1A is run.
Figure 3:
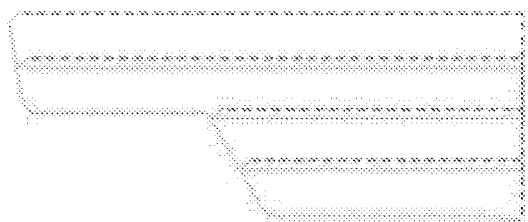
FIG. 3 is a diagram showing a tool path based on commands of FIG. 2.

FIG. 2 shows a block group that is commanded when the machining cycle of FIG. 1A is run. This block group is formed of a command block (ISO code) that is generated as the numerical controller interprets the commands described in the machining cycle and is indicative of the tool path. FIG. 3 shows the tool path based on the commands of FIG. 2. Broken lines and full lines indicate a fast-forward block and a cutting feed block, respectively.

In this way, the numerical controller interprets the machining cycle and automatically generates the tool path.

In general, the generated tool path varies depending on the cutting conditions. If the tool path varies, the number of generated blocks can also vary. In the case of a machining cycle for rough-turning processing, for example, if the cutting depth as one of the cutting conditions is halved, the number of blocks of the tool path almost doubles. A specific example is given below.

Figure 4:
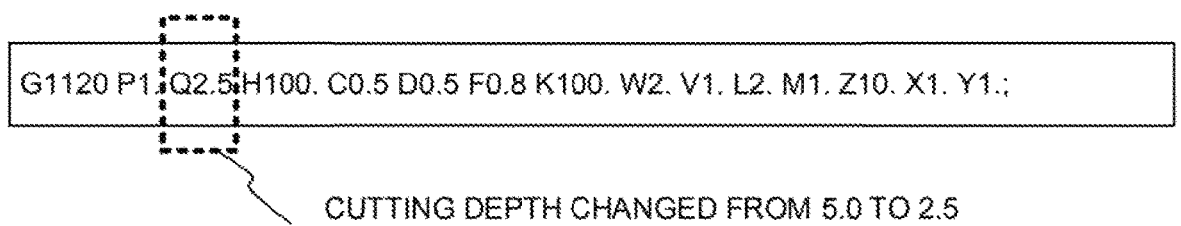
FIG. 4 is a diagram illustrating how a cutting condition of the machining cycle is changed.
Figure 5:
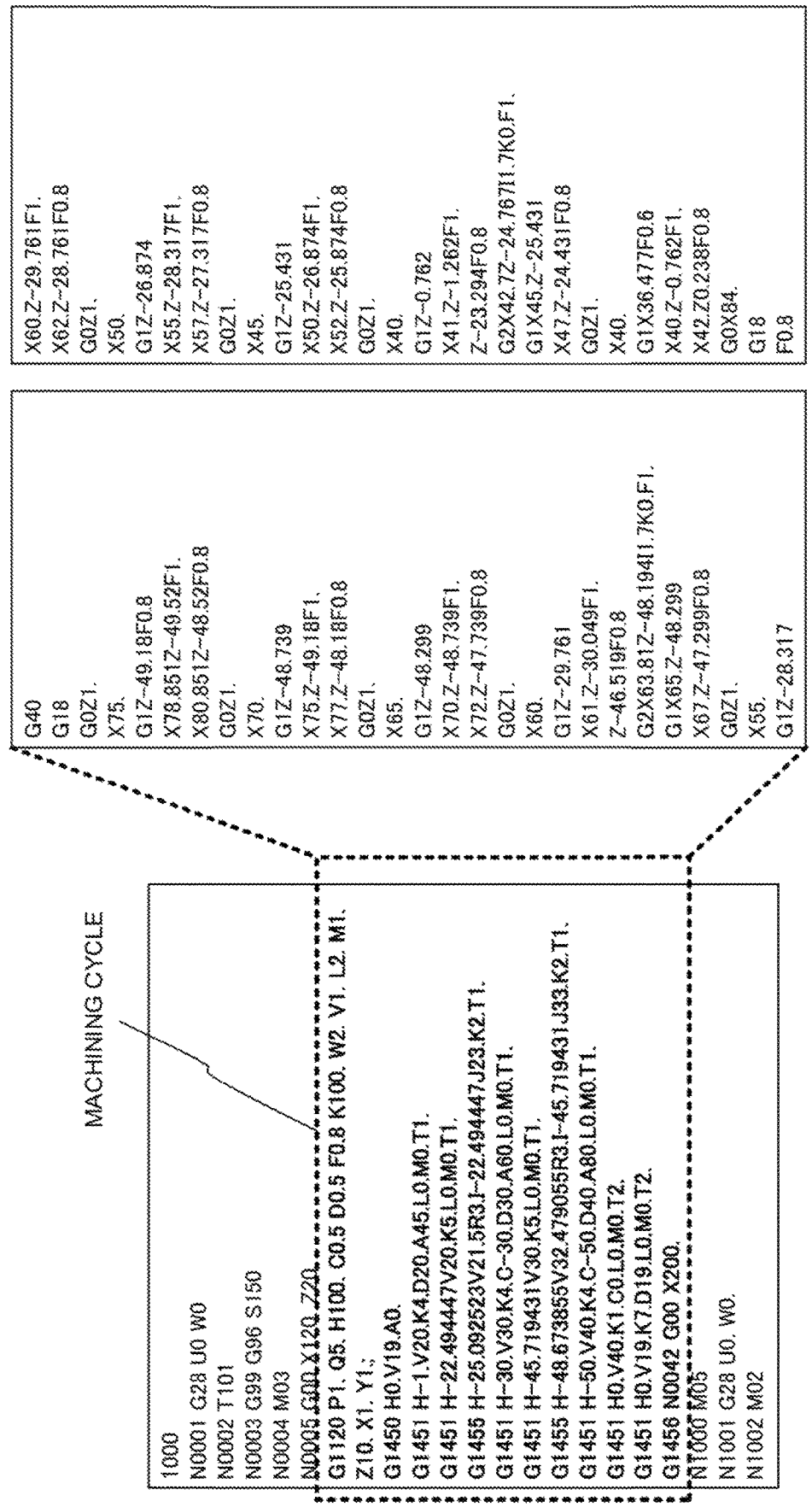
FIG. 5 is a diagram illustrating influences of the change of cutting conditions of the machining cycle.

As shown in FIG. 4, the cutting depth is changed from 5.0 to 2.5 in the machining cycle. Thereupon, the number of blocks of the tool path generated by the numerical controller almost doubles (as compared with that shown in FIG. 2), as shown in FIG. 5. FIG. 6 shows the tool path based on the commands of FIG. 5. Broken lines and full lines indicate a fast-forward block and a cutting feed block, respectively.

A program restart function restarts the machining from a specified block when the sequence number and block number of the block at which the program is expected to be restarted are specified. If the machining cycle resides in the program, the program may sometimes be restarted in the middle of the machining cycle. In this case, for example, the program may be restarted after the cutting conditions are changed with the machining temporarily stopped in the middle of the machining cycle. Specifically, in this case, the machining may be restarted after the cutting depth as a cutting condition is changed a little with the operation temporarily stopped during the operation of the machining cycle, since the machining load is too high. Alternatively, in this case, the machining may be restarted after the cutting depth is changed more drastically with the operation temporarily stopped to accelerate the machining during the operation of the machining cycle.

As described above, the numerical controller performs the machining after replacing the blocks of the machining cycle with those of the machining cycle. Moreover, if the cutting depth is changed, the number of blocks of the tool path generated by the numerical controller varies. Therefore, if the program is restarted after stopping the program, editing the machining cycle, and changing the cutting depth, the number of the block corresponding to a restart position may change inevitably in some cases. If the program is restarted after specifying the block number corresponding to a stop position at which the program is stopped, despite this, an unexpected operation may be performed. Waste may be caused by, for example, inevitable idling. In another case, restarting the operation from a non-machined position may cause a great danger. FIG. 7 shows an example of this problem. An arrow in the upper diagram of FIG. 7 indicates the end point of machining of a twelfth block of the program. Now let us assume that the machining is restarted after temporarily stopping the machining at the twelfth block of the program, editing the machining cycle, and doubling the cutting depth. Thereupon, the tool position at the time of program restart inevitably becomes the position indicated by an arrow in the lower diagram of FIG. 7.

Figure 20:
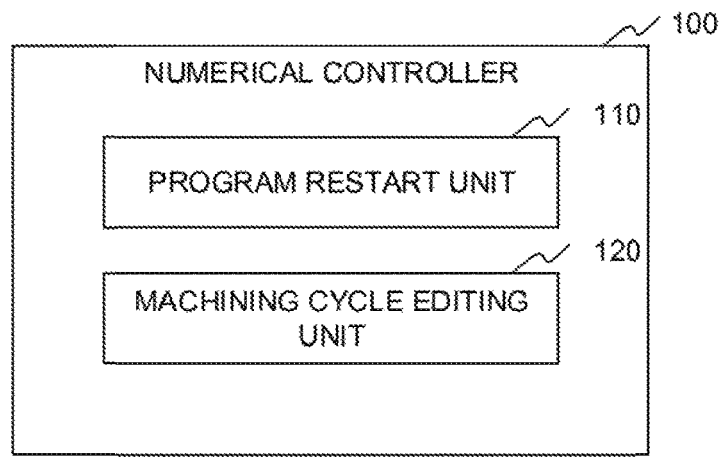
FIG. 20 is a block diagram showing the functional configuration of the numerical controller.

A numerical controller 100 according to an embodiment of the present invention has a structure for solving this problem. FIG. 20 is a block diagram showing the functional configuration of the numerical controller 100. The numerical controller 100 comprises a program restart unit 110 for implementing the program restart function and a machining cycle editing unit 120 for editing the machining cycle. The numerical controller 100 typically comprises a central processing unit (CPU), storage device, and input/output device. The program restart unit 110 and the machining cycle editing unit 120 are logically implemented as the CPU executes a program stored in the storage device.

The program restart unit 110, like a conventional program restart function, has a function of stopping the machining during the operation of the program, function of specifying the machining restart position, and function of restarting the machining from the specified restart position. The program restart unit 110 of the present embodiment is characterized in that it specifies the machining restart position by using a physical position in the machining area, not the block number that is conventionally used, in interrupting and restarting the machining in the middle of the machining cycle. The physical position in the machining area is given by, for example, coordinate values, a cutting depth obtained after the machining is already finished, or a machining allowance for restarting the machining.

The machining cycle editing unit 120 performs processing for editing the machining cycle according to a user's input operation or the like and changing the cutting conditions and the like. The program restart unit 110 may, for example, be configured to accept the specification of the restart position using the physical position in the machining area when it is detected by the machining cycle editing unit 120 that the machining cycle is edited while the machining is stopped.

EXAMPLE 1

As Example 1, an example is given in which the program restart unit 110 restarts the machining after the operation is interrupted (at a point indicated by an arrow in the lower diagram of FIG. 8) during the execution of the machining cycle (for which the machining area is indicated by an arrow in the upper diagram of FIG. 8) and the cutting conditions are changed in the machining cycle editing unit 120. The program restart unit 110 accepts the input of the coordinate values in order to determine the machining restart position. FIG. 9 shows an example of an input interface for the coordinate values. Usually, the tool position at the point in time of the interruption of the program is used for the coordinate values. Instead of inputting the coordinate values through the interface such as that shown in FIG. 9, the program restart unit 110 may previously store the coordinates of the tool position at the point in time of the interruption of the program and determine the machining restart position by using the coordinates concerned.

Figure 13:
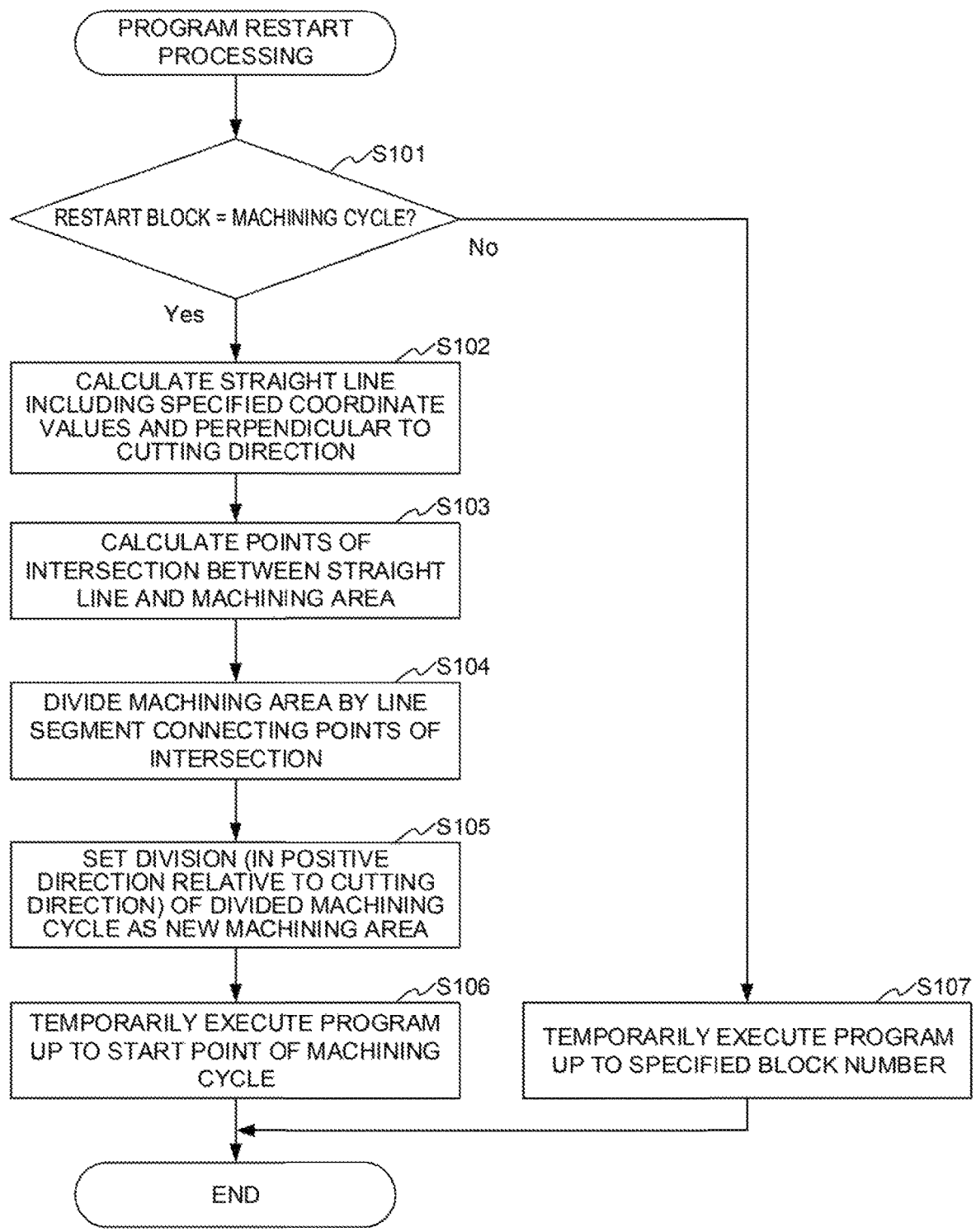
FIG. 13 is a flowchart showing the operation of the numerical controller according to Example 1.

An operation performed when the program restart unit 110 restarts the program will be described with reference to the flowchart of FIG. 13.

S101: Program restart processing is started. The program restart unit 110 determines whether or not the block for which the execution of the program should be restarted is the machining cycle. If the block concerned is the machining cycle, the operation proceeds to S102 after the coordinate values for the restart position are accepted. If not, the operation proceeds to S107.

Figure 10:
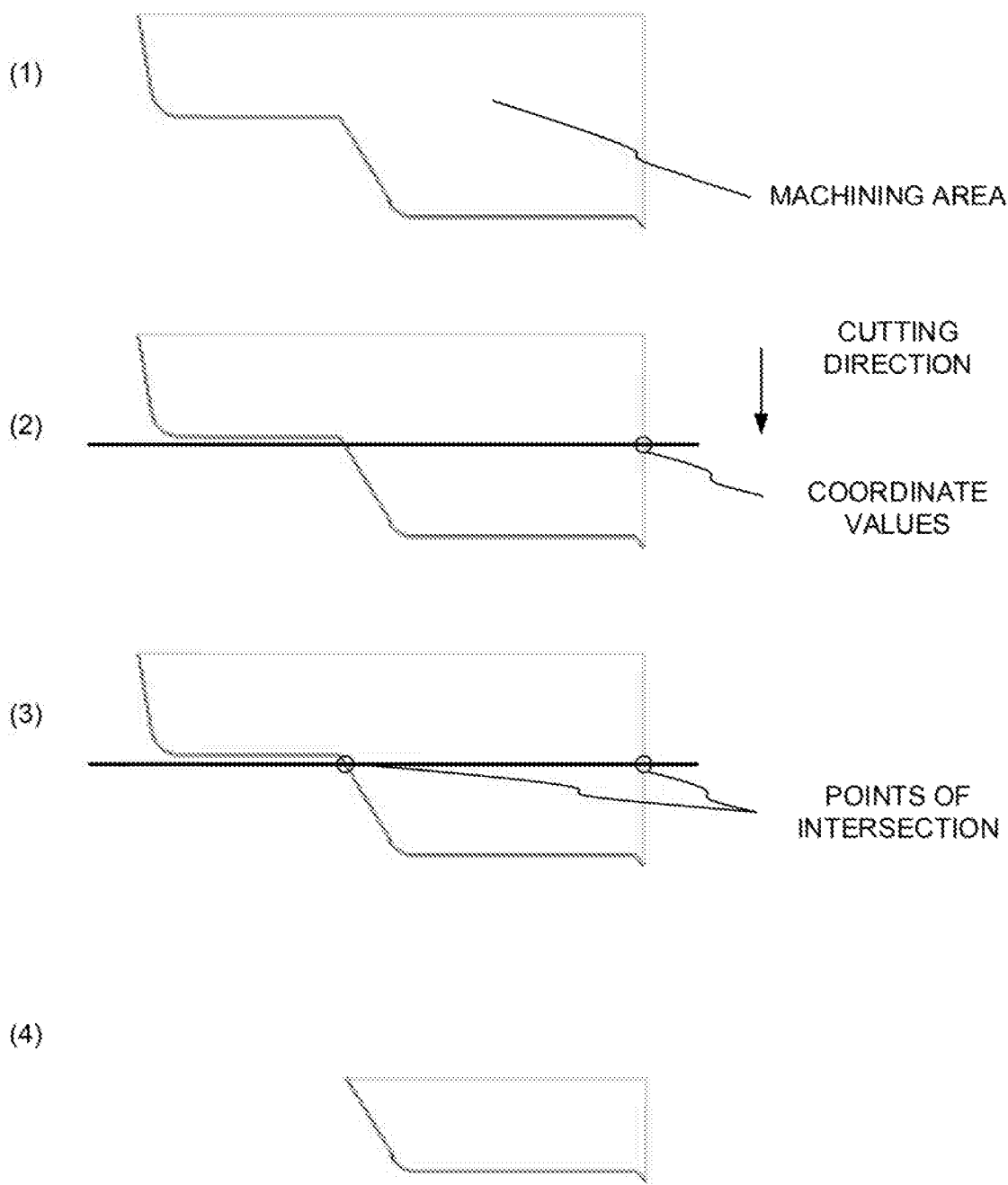
FIG. 10 is a diagram showing the operation of the numerical controller according to Example 1.

S102: The program restart unit 110 calculates a straight line that includes the coordinate values specified as the restart position and is perpendicular to the cutting direction (see the second diagram from the top of FIG. 10).

S103: The program restart unit 110 obtains two points of intersection between the straight line calculated in S102 and boundaries of the machining area.

S104: The program restart unit 110 divides the machining area by a line segment that connects the two points of intersection obtained in S103 (see the third diagram from the top of FIG. 10).

S105: The program restart unit 110 sets that division of the divided machining area which is located in a positive direction relative to the cutting direction as a new machining area (see the fourth diagram from the top of FIG. 10).

Figure 11:
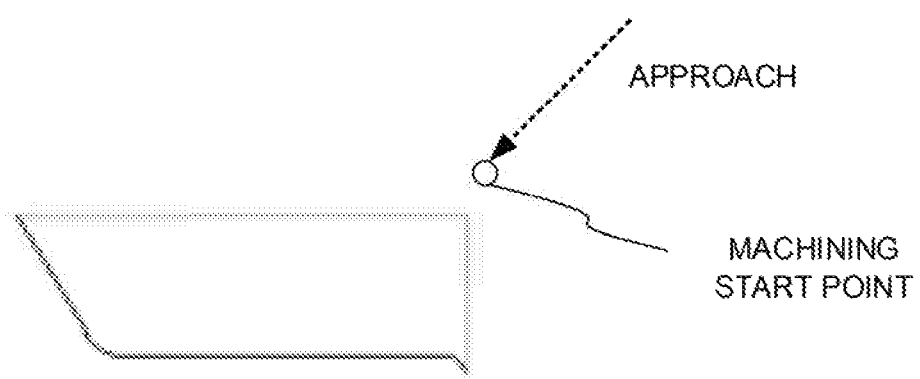
FIG. 11 is a diagram showing the operation of the numerical controller according to Example 1.
Figure 12:
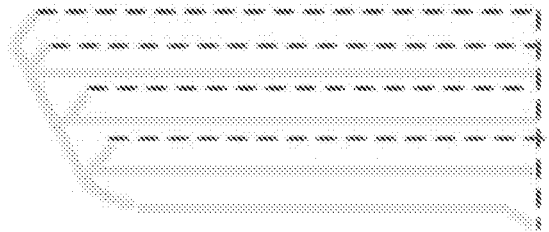
FIG. 12 is a diagram showing the operation of the numerical controller according to Example 1.

S106: The program restart unit 110 temporarily executes the program (to change only modal information and the like without driving a tool) up to the start point of the machining cycle, thereby restoring the modal information and the like. Thereafter, the tool is made to approach the machining start point in the new machining area generated in S105, and the machining is started according to the cutting conditions changed in the machining cycle editing unit 120 (see FIG. 11). Thus, a new machining cycle is defined by the new machining area generated in S105 and the cutting conditions changed in the machining cycle editing unit 120. Based on the new machining cycle, the program restart unit 110 generates a tool path anew and restarts the machining according to the new tool path (see FIG. 12).

S107: If the restart position is not the machining cycle, the program restart unit 110 can accept the specification of the restart position by the block number as usual. The program restart unit 110 restarts the execution of the program after temporarily executing the program up to the specified block number.

According to the present embodiment, the program restart unit 110 divides the machining area by the specified coordinate values and restarts the machining for the divisions of the divided machining area. In this way, the machining can be restarted from a proper position even if the machining conditions of the machining cycle are changed after the machining is stopped in the middle of the machining cycle.

EXAMPLE 2

As Example 2, an example is given in which the program restart unit 110 restarts the machining after the operation is interrupted (at a point indicated by an arrow in the lower diagram of FIG. 14) during the execution of the machining cycle (for which the machining area is indicated by an arrow in the upper diagram of FIG. 14) and the cutting conditions are changed in the machining cycle editing unit 120. The program restart unit 110 accepts the input of the cutting depth at the point in time of the interruption of the machining or the machining allowance at the restart of the machining in order to determine the machining restart position. The cutting depth at the point in time of the machining interruption is a distance from the outer edge of the material to the tool path for which the lathe turning is already finished. The machining allowance at the restart of the machining is a distance from the tool path for which the lathe turning is already finished to the deepest point of machining (see the lower diagram of FIG. 14). FIG. 15 shows an example of an input interface for the cutting depth at the point in time of the machining interruption or the machining allowance at the restart of the machining. Instead of inputting the cutting depth at the point in time of the machining interruption or the machining allowance at the restart of the machining through the interface such as that shown in FIG. 15, the program restart unit 110 may previously store the cutting depth at the point in time of the machining interruption or the machining allowance at the restart of the machining and determine the machining restart position by using the cutting depth at the point in time of the machining interruption or the machining allowance at the restart of the machining concerned.

An operation performed when the program restart unit 110 restarts the program will be described with reference to the flowchart of FIG. 19.

S201: Program restart processing is started. The program restart unit 110 determines whether or not the block for which the execution of the program should be restarted is the machining cycle. If the block concerned is the machining cycle, the operation proceeds to S202 after the cutting depth at the point in time of the machining interruption or the machining allowance at the restart of the machining is accepted. If not, the operation proceeds to S207.

Figure 16:
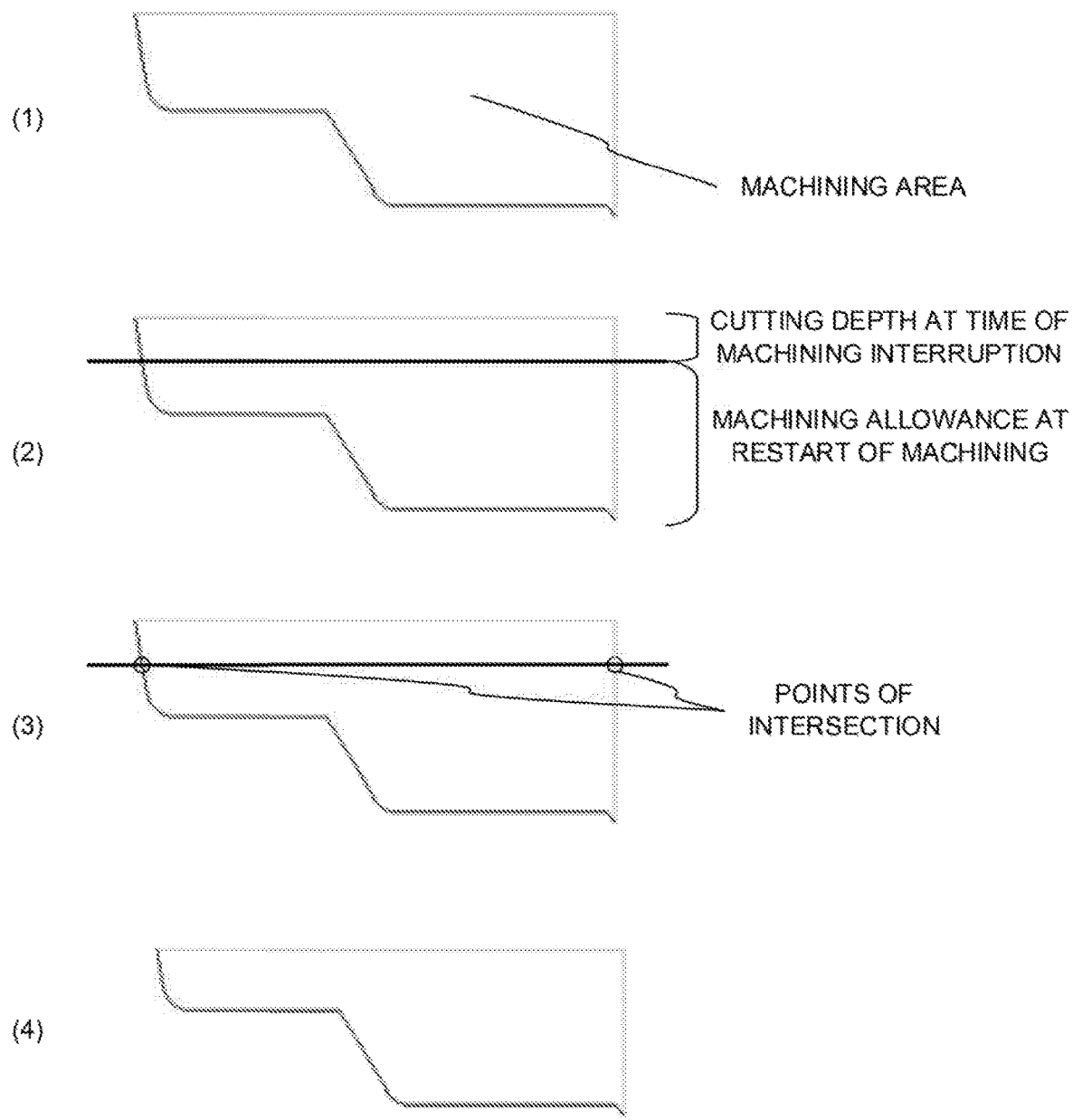
FIG. 16 is a diagram showing the operation of the numerical controller according to Example 2.

S202: The program restart unit 110 calculates a straight line that is located in a position corresponding to the specified cutting depth at the point in time of the machining interruption or the machining allowance at the restart of the machining and is perpendicular to the cutting direction (see the second diagram from the top of FIG. 16).

S203: The program restart unit 110 obtains two points of intersection between the straight line calculated in S202 and boundaries of the machining area.

S204: The program restart unit 110 divides the machining area by a line segment that connects the two points of intersection obtained in S203 (see the third diagram from the top of FIG. 16).

S205: The program restart unit 110 sets that division of the divided machining area which is located in a positive direction relative to the cutting direction as a new machining area (see the fourth diagram from the top of FIG. 16).

Figure 17:
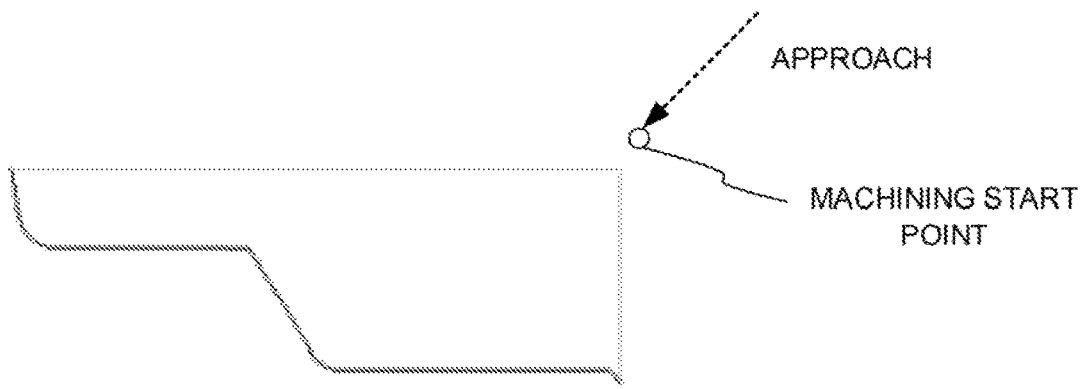
FIG. 17 is a diagram showing the operation of the numerical controller according to Example 2.
Figure 18:
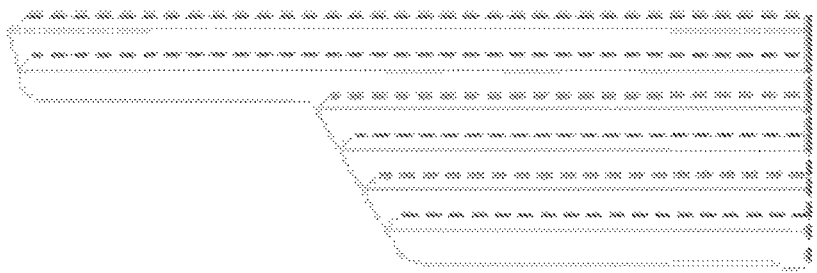
FIG. 18 is a diagram showing the operation of the numerical controller according to Example 2.

S206: The program restart unit 110 temporarily executes the program (to change only modal information and the like without driving the tool) up to the start point of the machining cycle, thereby restoring the modal information and the like. Thereafter, the tool is made to approach the machining start point in the new machining area generated in S205, and the machining is started according to the cutting conditions changed in the machining cycle editing unit 120 (see FIG. 17). Thus, a new machining cycle is defined by the new machining area generated in S205 and the cutting conditions changed in the machining cycle editing unit 120. Based on the new machining cycle, the program restart unit 110 generates a tool path anew and restarts the machining according to the new tool path (see FIG. 18).

S207: If the restart position is not the machining cycle, the program restart unit 110 can accept the specification of the restart position by the block number as usual. The program restart unit 110 restarts the execution of the program after temporarily executing the program up to the specified block number.

According to the present embodiment, the program restart unit 110 divides the machining area by the specified cutting depth at the point in time of the machining interruption or the machining allowance at the restart of the machining and restarts the machining for the divisions of the divided machining area. In this way, the machining can be restarted from a proper position even if the machining conditions of the machining cycle are changed after the machining is stopped in the middle of the machining cycle.

While an embodiment of the present invention has been described above, the invention is not limited to the above-described embodiment or examples and may be suitably modified and embodied in various forms.

In the above embodiment, the lathe turning has mainly been described by way of example. However, the present invention is also applicable to milling or other machining. Specifically, the present invention is applicable to any machining in which the machining cycle can be included in the program and the number of blocks can be varied by changing the machining blocks.

While embodiments of the present invention have been described above, the invention is not limited to the above-described embodiments and may be suitably modified and embodied in other forms.

The invention claimed is:

1. A numerical controller which performs program restart after machining is stopped in the middle of a machining cycle and machining conditions of the machining cycle are changed, the numerical controller comprising:
   a processor configured to:
      acquire a restart position located in a machining area defined by the machining cycle,
      create a new machining area by dividing the defined machining area with respect to the restart position, the defined machining area is divided by a line that is perpendicular to a cutting direction of the machining cycle and intersects the restart position,
      create a block group of commands of the machining cycle corresponding to a new tool path for the new machining area, and based on the changed machining conditions, and
      restart the machining along the new tool path for the new machining area by executing the created block group of the machining cycle.

2. The numerical controller according to claim 1, wherein the restart position is given by coordinate values.

3. The numerical controller according to claim 1, wherein the restart position is given by a cutting depth at a point in time of interruption of the machining or a machining allowance at the restart of the machining.

4. The numerical controller according to claim 1, wherein the processor stores a tool position at which the machining is stopped as the restart position.

* * * * *